March 17, 1970  K. C. EATON  3,501,016
ARTICLE STORAGE APPARATUS
Filed June 10, 1968   3 Sheets-Sheet 1
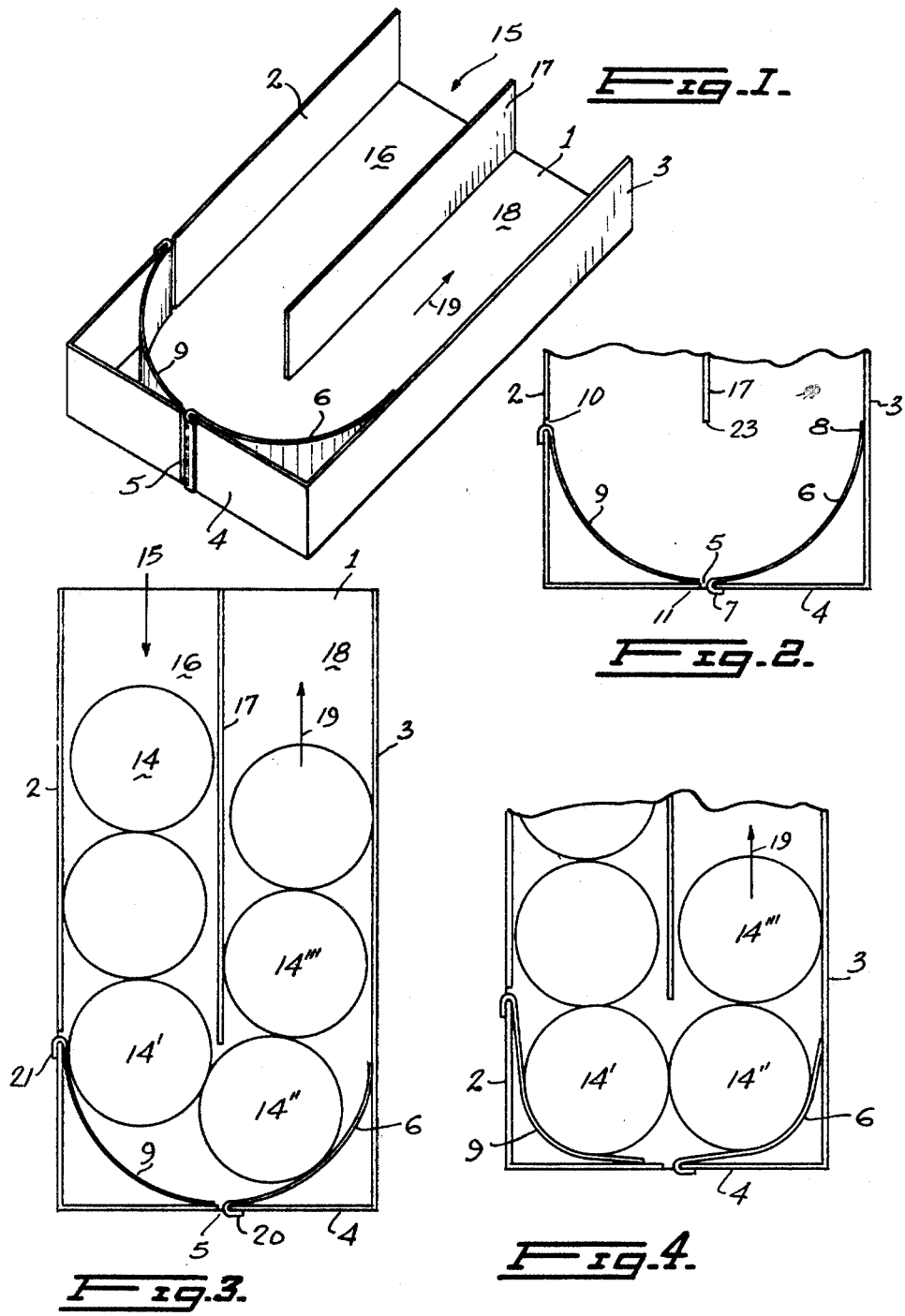

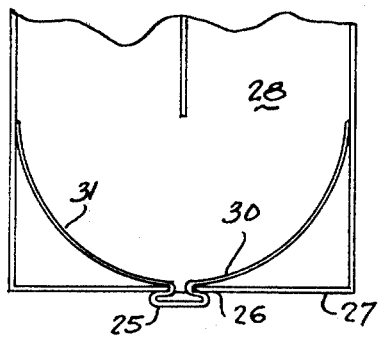
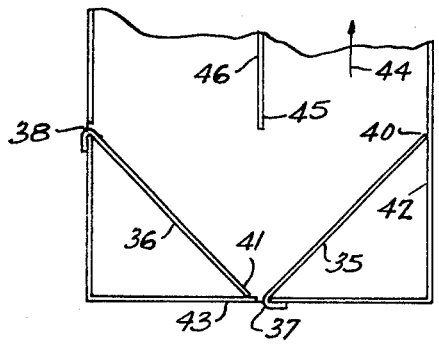
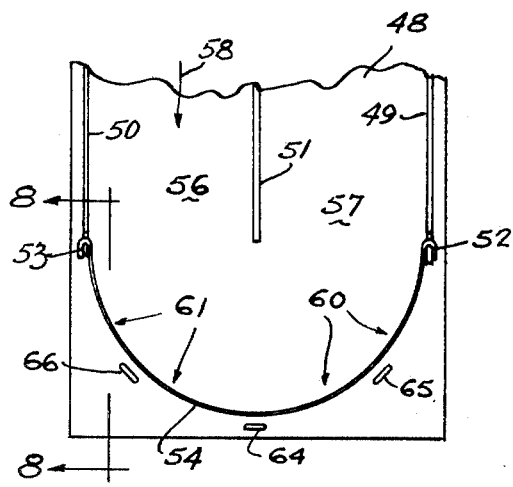
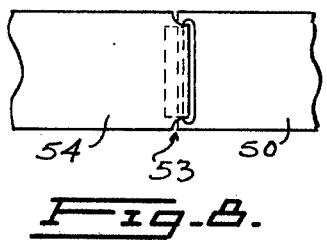
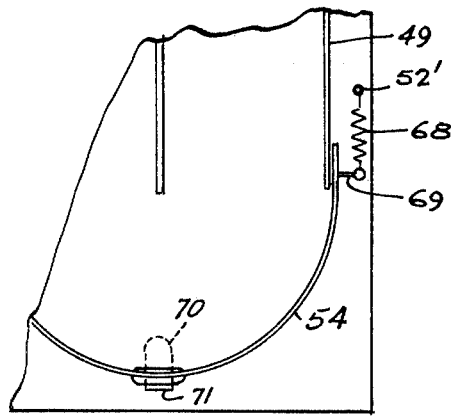
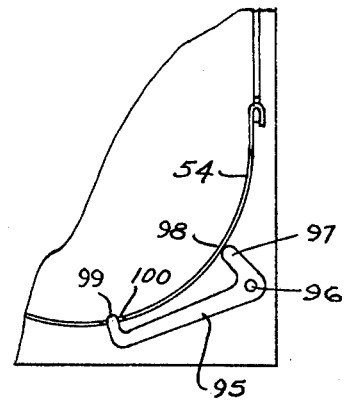

March 17, 1970  K. C. EATON  3,501,016
ARTICLE STORAGE APPARATUS
Filed June 10, 1968  3 Sheets-Sheet 3
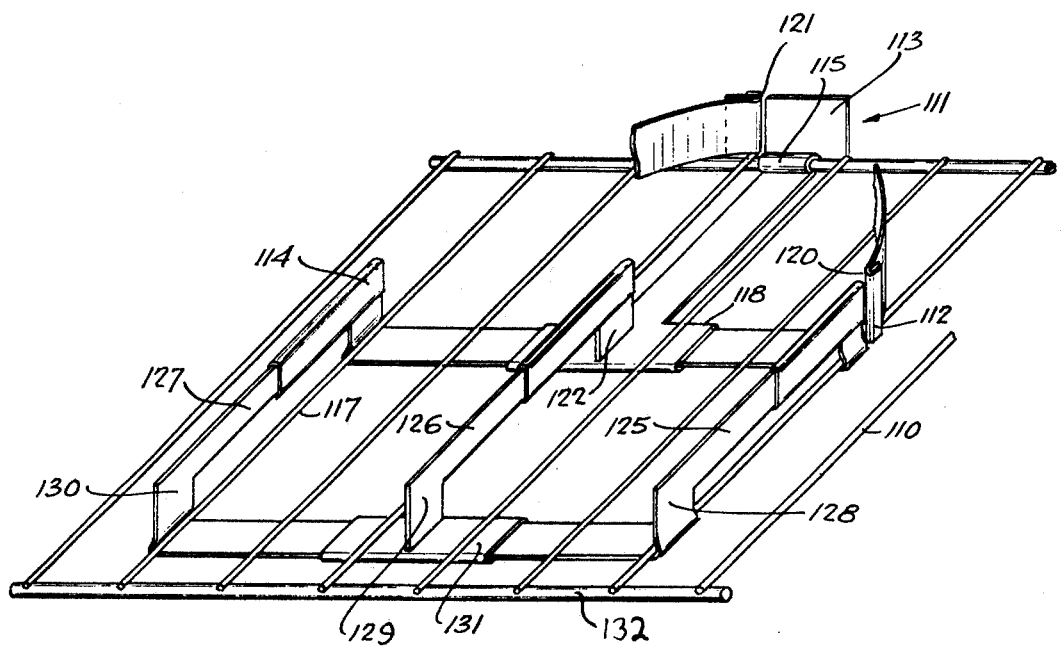
Fig.II.

United States Patent Office 3,501,016
Patented Mar. 17, 1970

3,501,016
ARTICLE STORAGE APPARATUS
Kenneth C. Eaton, P.O. Box 401,
Kingston, Ontario, Canada
Filed June 10, 1968, Ser. No. 735,624
Claims priority, application Canada, Feb. 5, 1968,
11,598
Int. Cl. A47f 7/00
U.S. Cl. 211—49          8 Claims

ABSTRACT OF THE DISCLOSURE

A storage rack for articles is disclosed in which the articles are received for storage at the front of a first channel and are delivered in series to the end of a second parallel channel, adjacent the point at which the articles are received, by the action of inserting the articles to be stored. The articles are prevented from jamming when passing from the first to the second channel by engagement with a resiliently deflectable surface which also urges the engaging article towards the second channel.

This invention relates to a novel storage apparatus for generally cylindrically faced containers and has particular reference to a compact storage apparatus into which the containers can be fed and from which they can be received in a continuous series.

The need for storage of cylindrically faced containers arises frequently and particularly with the storage of cans or bottles where space is limited and in which it is desirable that stock should be rotated, i.e. items in stock should be sold in preference to new stock. The problem also arises for instance in the storage of containers which are to be cooled in refrigerators in which it is desirable that containers which have been in the refrigerator for a certain length of time should be withdrawn in preference to those which have been recently introduced and which will therefore not be properly cooled.

In the past, racks have been designed for use in holding spaces such as refrigerators in which consecutive feed of containers was intended and U.S. Patents 2,581,363 and 2,678,735 show examples of these. A particular problem arises in this type of equipment because it is necessary that the containers being fed into the rack equipment provide the thrust for those containers which are being fed out. Thus although it is possible for the handler of the containers to reach into the shelf unit, it is imperative that merely by pushing on the series of containers being fed in, that the lead containers will be returned into the discharge part of the shelf. In the patents mentioned above, the problem was attempted to be overcome by placing side rollers on the shelf or alternatively by causing the containers to engage a turntable at the critical part of their travel.

I have found that with all the prior art apparatus known to me, problems arise as soon as one attempts to reduce the amount of space occupied by the storage equipment and when the clearance between the incoming and outgoing series of containers becomes minimal. In such instances, jamming of the containers at the turnaround between incoming and outgoing streams almost always occurs and the flow of containers becomes most unsatisfactory. At best the jam can be loosened by applying excessive force to and hammering against the incoming stream.

I have found that it is possible to overcome the drawbacks of the prior art and produce a satisfactory flow of containers while observing a very tight packing between the incoming and outgoing streams and achieving good turn-around without excessive force or the need for vibration or separate turntable or roller arrangements.

More particularly in accordance with the invention there is provided in an apparatus for the storage of generally cylindrically shaped articles including a pair of closely adjacent article receiving channels and having guide means arranged for directing articles, pushed into and along one of said channels through a turnaround path, into the other of said channels and to be forced along said other channel in a direction opposite to that of articles moving in the first channel, said turnaround path including a position at which forces on one of said articles tend to cause it to jam against movement into said other channel, said guide means comprising a resiliently deflectable surface engageable by each said article at said position for urging said article in a direction towards said other channel. The guide means preferably comprises a flexible strip or bar, preferably of a springy material such as spring steel.

The invention will now be described with reference to the accompanying drawings in which;

FIGURE 1 shows a perspective view of one embodiment of my invention,

FIGURE 2 shows a plan view of part of FIGURE 1,

FIGURE 3 is a plan view of FIGURE 1 with containers in position,

FIGURE 4 shows a detail of operation of the embodiment of FIGURE 1,

FIGURE 5 is an alternative arrangement according to the invention in plan view,

FIGURE 6 shows a further embodiment of the invention in plan view,

FIGURE 7 shows yet a further embodiment of the invention in plan view,

FIGURE 8 shows a side view of part of FIGURE 7 in the direction of arrows 8—8,

FIGURE 9 shows a plan view of a further modification of FIGURE 7,

FIGURE 10 shows a plan view of an alternative arrangement for FIGURE 7,

FIGURE 11 shows in perspective a scheme for adapting the invention to an existing shelf.

With reference now to FIGURES 1, 2 and 3 an embodiment of the invention is shown in which a tray 1 has integrally formed with it upturned edge rails 2 and 3. An upturned end 4 includes a slot 5 formed in it into which is hooked quadricircular spring strip 6 (suitably of spring steel) having hooked end 7 and simple end 8 which rests tangentially against the rail 3. A second quadricircular spring strip 9 is hooked into a slot 10 formed in rail 2 and rests against the end 4 tangentially at point 11. In this embodiment, containers 14 entered in the direction of arrow 15 into the inlet channel 16 between rail 2 and divider 17 encounter the strip 9, are guided by it onto the strip 6, and pass back up the outlet channel 18 in the direction of arrow 19. The strips 9 and 6 therefore define the outer limit of the turnaround path of the containers as they pass from the inlet channel 16 to the outlet channel 18. The strips 9 and 6 being of a spring material are free to distort outwardly when pressed by the containers and this prevents the jamming which is a feature of prior art constructions.

In the prior art arrangements, it is found that if the strips 9 and 6 are replaced by a rigid rail, similar to the rails 2 and 3 extending over the same path as the strips 9 and 6, containers such as 14' and 14" will reach a position, at approximately that shown in FIGURE 3, at which the forces exerted on the container 14" by the containers in the outlet channel 18, the container 14', the reaction from the defining rail (in the position of strip 6) the frictional forces at the points of contact between containers 14" and 14' and 14" and 14''' are such that jamming of container 14" occurs. In employing the invention, the strip 6 takes the place of the rigid defining rail and is resiliently free to distort and then to return to its original shape so that the thrust on container 14" in the direction of arrow 19 tends to increase with respect to the jamming forces exerted by container 14′. The container 14″ thus frees itself and starts to move down the channel 18. In the extreme condition, the containers 14′, 14″ and 14‴ can arrive at the situation shown in FIGURE 4 in which the strips 6 and 9 cannot be further distorted since they now conform to the outer contours of containers 14′ and 14″ by virtue of engagement against rail 2 end 4 and rail 3. In this extreme case, provided the strip 6 is of sufficient stiffness (and has not become plastically distorted) to exert a force in the direction of arrow 19 sufficient to overcome the frictional resistance of all the containers in the outlet channel 18, the container 14″ will move forward, container 14′ will be urged across and the procession of containers can continue. The amount of deflection of strips 9 and 6 is dependent upon a number of factors and will not necessarily always go to the extent shown in FIGURE 4. Thus, in instances where the friction between containers and between the surface of tray 1 and the containers is small, any tendency to jam is overcome with only slight deflection of the strips 9 and 6. The height of the strips 9 and 6 is also to some extent a matter of choice depending on the size, type and weight of containers intended to be accommodated the thickness of the strips, the material of which they are formed, and the way in which they are initially mounted. For instance, by extending the hook portion of the strips as shown at 20 and 21 in FIGURE 3 initially straight strips can be prestressed into the position shown in FIGURE 3 and thereby require more force for deflection than if they had not been initially prestressed.

In some instances where frictional forces are small it may be found convenient to make the strip 9 as a rigid rail similar to rails 2 and 3 since it is only over strip 6 that deflection is of the utmost importance. However, the presence of strip 9 does asisst the passage of the containers round the turn as explained in FIGURE 3 and the preferred apparatus includes this strip. The clearance between the end 23 of the dividing partition 17 and the strips 6 and 9 must at all times be sufficient to accommodate the diameter of the containers but otherwise is not particularly critical. However, there should be no engagement between containers in the inlet 16 and those in the outlet 18, except in the regions of the turnaround, and there should not be any contact between containers, except those directly succeeding one another.

This arrangement is particularly satisfactory in allowing for the thinnest possible dividing partition 17 while achieving complete and easy passage round the return bend between the inlet channel 16 and the outlet channel 18.

FIGURE 5 shows another embodiment in which the strip is continuous but is bent into a boss formation at 25 so that it can be accommodated in the slot 26 in the upturned end 27 of the tray 28. The operation of portion 30 of this strip is similar to strip 6 of FIGURE 1 whereas section 31 behaves like a somewhat more rigid rail to guide the containers round the first part of the bend. A prototype apparatus of FIGURE 5 for beer bottles of 2⅝″ width and 6½″ height, a spring steel strip of 1/32″ thickness and ¾″ height, operated very satisfactorily using a metal tray and rails. Alternatively the strip of FIGURE 5 may omit the bars, be continuous and be spot welded to end 27 instead.

In FIGURE 6 a further embodiment is shown in which the strips 6 and 9 of FIGURE 1 have been replaced by straight strips 35 and 36 of a spring material. These strips are located in slots 37 and 38 respectively and are free to move at their ends 40 and 41 against the upturned rail 42 and end flange 43 respectively. The operation of this embodiment is similar to the earlier described ones, the principal feature being the deflection of the strip 35 to free the container engaging it and to urge it in the forward direction of arrow 44. The clearance between end 45 of the divider 46 and the strips 35 and 36 respectively is adjusted to suit the size of container for which the apparatus is designed. This embodiment is similar to that described for FIGURES 1 to 4 but in which initially straight strips are not prestressed.

FIGURE 7 is a plan view of another embodiment of the invention and consists of a tray 48 on which are fixedly mounted separate upwardly extending guide rails 49 and 50, midway between which is an upwardly extending thin dividing partition 51. Cylindrical containers (such as 4 of FIGURES 3 and 4) are entered into the tray from the front in the direction of the arrow 58. The inner ends of the rails 49 and 50 carry pivot mounts 52 and 53 to which are linked the ends of a generally semicircular band or strip 54. The strip 54 can be of a spring steel, but need not be as long as it retains its shape and is somewhat elastic. Aluminum strip is for instance suitable and stiff plastic materials might be used in particular instances where the use of a cheap non-corrosive substance is thought desirable. The strip 54 extends about the same height as the rails 49 and 50 and serves to define the outer limit of the turn around path of containers as they pass from the inlet channel 56 to the outlet channel 57 under the influence of pressure exerted in the direction of arrow 58. The strip 54 being flexible is free to distort under the pressure exerted by containers in the turn around and the container in contact with the strip in the area of arrows 61, by deflection of the strip causes a forward urging (towards channel 57) on the container in contact with the area of arrows 60. If necessary the strip 54 may be limited in the amount of distortion it can undergo by a stop 64 raised on the tray 48. If the strip 54 is thin and flexible, additional stops 65 and 66 may be provided to further limti the distortion. In extreme cases where the strip is very thin, a continuous stop outlining the permitted distortion of the strip may extend from adjacent the pivot to the pivot 53.

While the embodiment of FIGURE 7 has described an arrangement in which a strip 54 is pivotally linked at 52 and 53, the arrangement of FIGURE 8 may be used in which the strip 54 is shown linked to the rail 50. Alternatively a spring linkage such as shown in FIGURE 9 might be employed. In this case the pivot 52 is replaced by a stud 52′ attached by means of a spring 68 to a suitable attachment peg 69 on the strip 54. A similar spring arrangement could be employed at the pivot 53 although it is probable that some locating arrangement for the strip 54 would be required such as a tab 70 extending into a slot 71 formed in the tray 48 in the region of the stop 64 such as shown in broken lines in FIGURE 7.

The arrangement of FIGURE 7 may be modified if desired as shown in FIGURE 10 to include the amplification linkage 95 which pivots on a fulcrum 96 and has its short arm 97 engaging the strip 54 at 98. Pressure of a container against the strip 54 in the region of 98 allows an amplified movement of the end 99 is free to urge the container forward and effectively acts to free it from the jamming condition.

FIGURE 11 shows an arrangement in which the invention particularly of FIGURES 1 to 4 may be adapted to an already existing shelf 110 such as may be encountered in a refrigerator or storage rack. A one piece unit 111 consisting of strip supports 112, 113 and 114 can be raised from beneath the shelf 110 and clipped into place by virtue of the embracing band 115 and the engagement of supports 112 and 114 with adjacent bars 116 and 117. The expander section 118 allows relative inwards and outwards movement between the supports 112 and 114 to adapt to the size of shelf and the containers to be stored, and includes suitable means for fastening the supports from relative movement. Slots 120 and 121 defined in supports 112 and 113 respectively receive spring strips (not shown, but similar to strips 6 and 9). The section 118 includes a central divider post 122 and each of 112, 114 and 122 carries a telescopic bar 125, 126 and 127 respectively for coupling with posts 128, 129 and 130 mounted as a unit across the bars at the front of the shelf using a similar expander section 131.

While FIGURE 11 shows the front end of the unit 111 supported by the shelf bars 116 and 117 it will be clear that it might be supported by an embracing band formed on expander 131 engaging the front transverse bar 132 in a manner exactly similar to band 115.

I claim:

1. In an apparatus for the storage of generally cylindrically shaped articles including a pair of closely adjacent article receiving channels, and having guide means defining a turnaround path and arranged for directing articles, pushed into and along one of said channels through the turnaround path into the other of said channels to be forced along said other channel in a direction opposite to that of articles moving in the first channel, said turnaround path including a position at which forces exerted on one of said articles tend to cause it to jam against movement into said other channel, and said guide means comprising a resiliently deflectable surface engageable by each said article at said position for urging said article in a direction towards said other channel.

2. Apparatus as defined in claim 1 said guide means comprising a spring material.

3. Apparatus as defined in claim 2 said guide means comprising a spring metal strip.

4. Apparatus as defined in claim 1 comprising a pair of guide rails, and an intermediate guide partition defining the inlet and outlet channels, said guide means comprising, a resiliently deflectable elongated flexible member supported at a point upstream of the said position in the path of said articles.

5. Apparatus as defined in claim 1 said guide means comprising a pair of upwardly extending strips, a first strip supported at one end at the entrance to said turnaround path and means slidably supporting the other end of said first strip substantially at a point half way through the turnaround path, a second strip supported at said half way point, and means slidably supporting the other end of said second strip at the end of said turnaround path, said slidable supporting means permitting movement of said respective strips only in the general direction of flow of said articles adjacent said respective supporting means.

6. Apparatus as defined in claim 1, comprising a pair of guide rails defining the outer limits of said inlet and outlet channels, said guide means comprising an upwardly extending flexible member extending between said rails, and spring support means retaining the ends of said member permitting movement substantially only in the direction of extension of said rails at the respective ends.

7. Apparatus as defined in claim 1 comprising stop means for limiting the deflection of said guide means.

8. Apparatus as defined in claim 1 including lever means having a pair of ends and fulcrumed adjacent said turnaround path, one of said ends being deflectable by thrust exerted by said article against said guide means in said position, and means permitting the other end of said lever to engage said article for urging said article in the direction of travel of articles in said outlet channel.

References Cited

UNITED STATES PATENTS

| | | | |
|---|---|---|---|
| 2,029,109 | 1/1936 | Kucher | 211—49 |
| 2,852,327 | 9/1958 | Mason | 211—49 |
| 2,954,129 | 9/1960 | Gordon | 211—49 |
| 3,055,293 | 9/1962 | Lariccia | 211—49 |

JAMES A. LEPPINK, Primary Examiner

U.S. Cl. X.R.

211—74; 221—66